Nov. 17, 1970    A. BISBERG    3,540,826

SATURATION HYGROMETER

Filed June 6, 1968

INVENTOR
ARTHUR BISBERG

BY: Ralph L. Cadwalader
Lawrence P. Benjamin

ATTORNEYS

United States Patent Office 3,540,826
Patented Nov. 17, 1970

3,540,826
SATURATION HYGROMETER
Arthur Bisberg, Lexington, Mass., assignor, by mesne assignments, to EG & G, Inc., Bedford, Mass., a corporation of Massachusetts
Filed June 6, 1968, Ser. No. 734,989
Int. Cl. G01n 15/02, 25/02
U.S. Cl. 356—102                    15 Claims

ABSTRACT OF THE DISCLOSURE

A saturation hygrometer detects the onset of water vapor saturation in a flowing stream of gas. A continuous sample of the gas is directed into a venturi duct section and is cooled upon adiabatic expansion of the gas. A beam of light is directed diagonally across the section and normally impinges against a first photocell. A second photocell is connected in a bridge circuit with the first and detects scattered light from condensation droplets forming within the section to provide an output from the bridge circuit to an indicator. The hygrometer is fail-safe in that failure of the lamp providing the beam of light will produce an indication.

BACKGROUND OF THE INVENTION

This invention relates to hygrometers and, more particularly, to a saturation hygrometer for detecting the onset of water vapor saturation in a flowing stream of gas.

In many processes and systems employing a flowing gas stream, the occurrence of water vapor saturation is undesirable in that it will result in moisture or ice formation on surfaces within the system. The icing of aircraft surfaces when an aircraft flies through water vapor saturated air and the condensation which forms within air conditioning ducts are examples. In cooling systems employed on jet aircraft for cooling personnel and/or electronic equipment, for instance, the air which is received from the first compressor is frequently saturated; and the condensation which forms may result in damage to critical equipment.

It has been proposed in the prior art to detect the condensation as it is formed. For example, it has been suggested that an ice detector sense the formation of ice on an aircraft surface in order to effectuate a corrective action. However, such systems have the disadvantage that they operate after the condition to be avoided has already occurred and will frequently react too slowly to correct the situation effectively.

It is a fundamental principle of the present invention that the approach of a condition of water vapor saturation be detected before the water vapor saturation level is attained. This makes it possible for adequate remedial action to be effected in advance of saturation. In the case of ice buildup on aircraft surfaces, for example, the surfaces could be heated in response to the indicated onset of saturation to prevent the buildup before saturation is reached. In an air cooling system, a heater could be actuated to lower the saturation level of the gas stream in response to an indicated approach of saturation.

While there are a number of gas moisture indicators in the prior art, the prior art systems are subject to a number of drawbacks which make them unsuitable for detecting the onset of saturation. In the dew point indicator shown in U.S. Pat. No. 3,216,257, for example, a high pressure gas stream is gradually cooled by the introduction of cool nitrogen gas, the temperature of which is manually lowered gradually by adjusting a rheostat in a heating circuit, until vapor or frost crystals form in the gas stream. This crystallized or frosted vapor passes through a light beam to reduce the amount of light reaching a photoelectric cell, and the temperature of the nitrogen gas is monitored to indicate the dew point of the gas stream. Since this system requires a liquid nitrogen source, a valve, a heater, and temperature measuring means, it is unduly expensive, unreliable, and inconvenient to use.

Another high pressure gas moisture indicator is shown in U.S. Pat. No. 3,152,475. In this device, the formation of condensate is detected when a cooled capillary passageway, which normally admits a sample of the gas under pressure to keep an indicator vane extended, becomes clogged with frost. This system is slow in operation, because time is required for frost to build up in the capillary tube. The capillary tube is also subject to clogging creating an undesirable maintenance problem.

In the apparatus disclosed in Pat. No. 2,829,363, the dew point of a gas is detected in a closed chamber. A measured charge of the gas is introduced into the chamber and adiabatically expanded to reduce the temperature of the gas. The formation of condensation droplets is optically detected by the scattering of light from a light beam to a photocell. This system has the drawback that it does not monitor the gas continuously, requiring the introduction of a measured charge to a closed chamber.

SUMMARY OF THE INVENTION

It is accordingly the principal object of this invention to provide an improved device and method for detecting the onset of water vapor saturation in a stream of gas.

More specifically, it is an object of the invention to provide a saturation hygrometer which will detect the onset of water vapor saturation in a flowing gas stream and which is continuous in operation, provides substantially instantaneous response, is free of moving or delicate parts, is relatively low in cost, has low power requirements, and is highly reliable.

It is a further object of the invention to provide a saturation hygrometer of this character which can be instrumented in a fail-safe manner to provide a signal when a light source or detector fails.

The principle of operation of the invention is based upon the increase in the level of water vapor saturation which accompanies a drop in the temperature of a gas. When the gas temperature becomes equal to the dew point of the gas, the gas will become fully saturated and condensate droplets will form. By lowering the temperature of a sample of a gas stream, detectable condensation will be produced in the sample prior to condensate formation in the stream.

Accordingly, it is contemplated by the invention that means be provided to lower the temperature of a continuous gas sample of a flowing gas stream so that condensate droplets will form therein in advance of water vapor saturation of the gas stream. The gas sample is passed through means such as venturi duct section, within which it is adiabatically expanded. The adiabatic expansion results in a fixed predetermined drop in gas temperature in accordance with the equation:

$$T_2 = T_1 \left(\frac{P_2}{P_1}\right)^{\frac{k-1}{k}}$$

where $T_2$ is the gas temperature at pressure $P_2$ in degrees Kelvin
$T_1$ is the initial gas temperature in degrees Kelvin
$P_1$ is the initial absolute pressure
$P_2$ is the absolute pressure after expansion
$k = 1.4$ for ideal gases.

The desired temperature reduction is small compared to the absolute gas temperature. The incremental temperature reduction can be obtained by differentiating the above equation. If the upstream temperature $T_1$ and the pressure $P_1$ are constant, the result is defined in the following equation:

$$\Delta T = \frac{k-1}{k} T_2 \frac{\Delta P}{P_2}$$

where $\Delta T$ is the drop in temperature
$\Delta P$ is the drop is pressure.

Thus, for a temperature of 250° K. a four-percent drop in pressure will result in a drop in temperature of nearly 3° C. If the incoming gas is within 3° C. of saturation, it will become supersaturated as it passes through the duct section and condensation will occur. The expansion of the gas, in addition to causing a drop of gas temperature and a decrease in pressure, also causes a decrease in the dew point of the incoming gas. However, the decrease in the dew point temperature is about one-sixth the decrease in the gas temperature for saturation under the above assumed conditions. Thus, while the gas temperature drops by 3° C., the dew point drops ½° C., which is of no consequence.

The presence of condensate in the venturi duct section is detected by means of an optical system utilizing a diagonally directed light beam and a pair of photocells connected in a bridge circuit. One of the photocells is aligned with the light beam, while the other photocell is not aligned with the light beam but is directed toward the region of condensate cloud formation to receive scattered light from condensate droplets. The bridge is normally balanced to provide a null output to an indicator when all of the light from the light beam is directed to the first photocell and becomes unbalanced when light is received by the second photocell to provide an output to the indicator signifying cloud formation.

Since the ability of the gas to condense rapidly depends to a great extent on the presence of nuclei on which the moisture condenses, it may be necessary in special cases, where the gas is deficient in natural nuclei, to provide condensation nuclei artificially. If an insufficient number of nuclei are present, the degree of supersaturation required before condensation forms may be excessive. For this reason, the invention contemplates the use of a source of nuclei within the venturi duct section; this source may take the form of a brush discharge from a sharp electrode excited with high voltage, the injection of fine particles, or an alpha radiation source.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment.

DESCRIPTION OF THE PREFERRED EMBODIMENT

Figure 1:
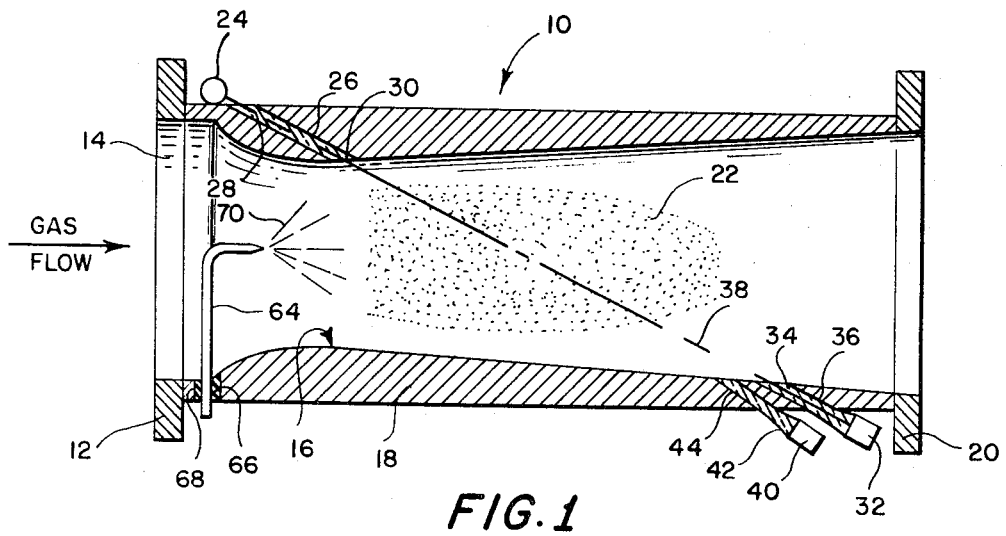
FIG. 1 discloses a schematic section view of a venturi duct section of the invention.

Referring to FIG. 1, it will be seen that a sample of the flowing gas stream being monitored is continuously fed through a venturi duct section 10 which has an inlet fitting flange 12 providing an inlet opening 14. The venturi duct section includes a suitably shaped inner wall surface 16 formed on a cylindrical wall section 18. As is customary in venturi duct sections, the surface 16 rapidly decreases the internal diameter of the section and then gradually increases the internal diameter so that gas entering through opening 14 will adiabatically expand with a consequent reduction in the pressure of the gas. As pointed out above, this reduction in pressure is accompanied by a reduction in gas temperature. It is to be understood that the extent of advance warning of the onset of saturation desired will establish the amount of cooling to be provided by the venturi duct section, which must be designed to lower the temperature of the gas the number of degrees required. The outlet end of venturi duct section 10 is provided with an appropriate fitting flange 20.

As illustrated at 22, if the gas introduced into the venturi duct section is close to water vapor saturation (as determined by the design of the venturi), the reduction of temperature will result in the formation of a condensate cloud 22 in the coldest region of the duct section. In order to detect the formation of cloud 22, which indicates the onset of saturation, a lamp 24 is suitably mounted near the inlet end of venturi duct section 10 on the exterior surface of wall 18. In order to admit light from the lamp 24 through wall 18, an opening 26 is provided therethrough and filled with a fiber optics element 28 which, as illustrated, is aligned at its outer end with lamp 24. The inner end of fiber optics element 28 is provided with a smooth surface 30 which is continuous with the inner surface 16 of the venturi duct section so that it will not interfere with gas flow within the section. On the opposite side of the venturi duct section 10, close to the outlet end thereof, is located a first photoconductive cell 32. This cell is mounted contiguous to the end of a fiber optics element 34 which extends through an opening 36 provided through wall 18 of venturi duct section 10. It will be noted that fiber optics element 34 is aligned with fiber optic elements 28 so that a beam of light extending along line 38 will, under normal circumstances, when there is no condensate cloud within the duct section, cause of all of the light beam from lamp 28 to be received by photoconductive cell 32.

In addition to photoconductive cell 32 which, as described above, receives the light beam directly, a second photoconductive cell 40 is provided. This cell is mounted contiguous to the end of a fiber optics element 42 which extends through an opening 44 provided through wall 18 of the venturi duct section. Unlike fiber optics element 34, fiber optics element 42 is not aligned with the light beam along line 38. Thus, when no condensate droplets are present within the venturi duct section, none of the light beam is received by the second photoconductive cell 40. However, when condensate droplets form as shown at 22, two effects result. In the first place, light is scattered by the droplets, causing some of this light to be directed toward fiber optics element 42 and thus be received by the second photocell 40. In addition, the condensate droplets have an attenuating effect on the light beam causing a drop in the light intensity received by the first photoconductive cell 32.

It is to be noted that the inner ends of fiber optics elements 34 and 42 form a smooth continuation of the inner wall surface 16 to avoid interference with gas flow through section 10.

Figure 2:
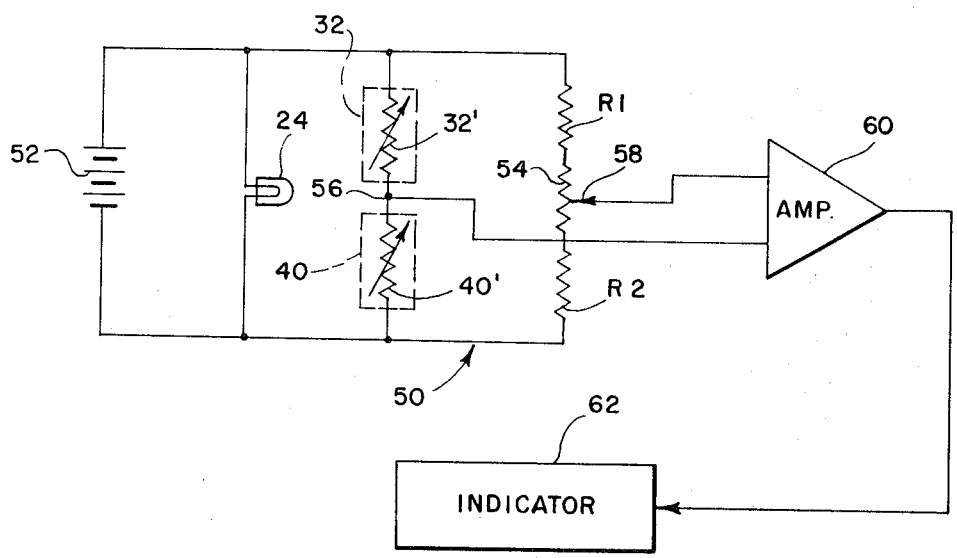
FIG. 2 shows a schematic circuit diagram of the invention.

The manner in which the photoconductive cells are effective to detect the formation of condensate cloud 22 will be apparent from consideration of the circuit schematic of FIG. 2. It will be seen that a variable resistance 32', corresponding to photoconductive cell 32, and a variable resistance 40', corresponding to photoconductive cell 40, are connected as two series-connected arms of a bridge circuit 50, forming a first branch of the bridge connected across a battery, or equivalent, source of direct current 52. Lamp 24 may also be connected directly across source 52. The other branch of the bridge is formed by a first fixed resistor R1 in series with a potentiometer resistance 54 and a second fixed resistor R2. The output signal from bridge 50 is taken from the junction 56 between photoconductor resistances 32' and 40' and the variable tap 58 of potentiometer 54 and is connected to the input circuit of an amplifier 60, which may be a transistorized operational amplifier. The output from the amplifier is connected to a suitable indicator or alarm 62, such as a bell or signal lamp. It is to be understood that in an automatic control system, suitable automatic control means could be substituted for the indicator. For example, in an air cooling system the output signal from amplifier 60 could be employed to control the injection of heat upstream.

While, ordinarily, there will be a sufficient number of condensation nuclei present in the gas sample introduced into venturi duct section 10, there may be a shortage of nuclei in special cases, such as where the gas has been well filtered or when the air sample is taken at a very high altitude. In such cases, nuclei can be furnished by artificial means. In the embodiment shown in FIG. 1, this means takes the form of a sharp electrode 64 which extends through an insulating bushing 66 provided through an opening 68 through wall 18. When a high voltage is applied to electrode 64, a brush discharge is provided as shown at 70. This discharge forms electrons, ions, or other charged particles, all of which may serve as condensation nuclei. It is to be understood that other sources of nuclei may be utilized. For example, a radioactive alpha particle emitter may be used to supply nuclei within venturi duct section 10. Alternatively, nuclei may be provided by the injection of fine particles, such as silver iodide particles.

In considering the operation of a saturation hygrometer of the invention, it is to be borne in mind that venturi duct section 10 is preferably designed to provide a temperature drop of from two to five degrees centigrade. Thus, the device will provide advance warning of the onset of saturation by detecting the occurrence of condensate formation approximately two to five degrees centigrade below the ambient temperature of the gas stream. Since the response of the hygrometer is quite rapid, providing an indication within a second or so, this will ordinarily give sufficient advance warning so that adequate and timely remedial action may be effected.

A sample of the gas stream being monitored, which may, as previously mentioned, be a stream of air passing through the ducts of a cooling system of an aircraft, is directed through venturi duct section 10 and is caused to expand adiabatically with a consequent drop in temperature to an extent governed by the design of the venturi duct section. If the gas is quite dry, no condensation will occur as it passes through the venturi duct section. If, however, the gas is nearly saturated with water vapor— that is, if its dew point is only one or two degrees centigrade below the gas temperature—then, as the gas passes through the venturi duct section and is cooled several degrees, the moisture in the gas will condense on condensation nuclei naturally present in the gas, or artificially provided by electrode 64, and form cloud 22.

It remains necessary to detect the presence or absence of cloud 22. The detection is performed by optical means comprising the lamp 24 and photocells 32 and 40. The lamp provides a sharp beam of light along the line 38 which extends through fiber optics element 28 and is directed to the first photocell 32. Normally, when no condensate cloud has formed in the venturi duct section, no light is received by the second photocell 40. When, however, condensate droplets form, the light beam will be subjected to scattering by the droplets so that some of the light therefrom will be received by photocell 40. The attenuation of the light beam by the condensate droplets forming cloud 22 will also result in a reduction of the light intensity received by photocell 32.

As already mentioned, the two photocells are placed in electrical bridge circuit 50. In operation, the bridge circuit is balanced by adjusting potentiometer 54 to produce zero output voltage when dry gas (gas which will not form a condensate cloud) is passing through the duct section. At this time, photocell 32 will receive high light intensity from lamp 24 and photocell 40 will receive low or zero light intensity. When the moisture level of the gas approaches saturation, condensate cloud 22 will form and result in a decrease in the light received by photocell 32 and an increase in the light received by photocell 40. Both of these factors will act to provide a rising output voltage across diagonal 56–58 of bridge circuit 50 which will be indicative of a saturation condition. This output voltage is amplified in amplifier 60 and coupled to a suitable indicator device or control circuit 62.

Failure of lamp 24 or obscuration of the light beam will result in a decrease in the light intensity received by photocell 32. This will also cause an unbalanced condition to occur in bridge circuit 50 also providing an output voltage to amplifier 60. Thus, burn-out, or other failure, of the lamp will result in an alarm condition indicated by indicator 62.

Apparatus of the invention will have relatively low power requirements. It is estimated, for example, that a typical hygrometer of the invention, employing a 28-volt battery, will consume 2.5 watts.

While the embodiment of the invention just described makes use of a venturi duct section to adiabatically expand the gas and thus reduce its temperature, it is to be understood that other and equivalent means for accomplishing this purpose could be employed. For example, a vortex device, such as a Hilsch tube, or an orifice plate might be employed for adiabatically expanding the gas.

Although photoconductor cells 32 and 40 are employed in the embodiment illustrated, it is to be understood that other and equivalent photosensitive device could be substituted. For example, photo-voltaic cells or photo-transistors could be used.

While a preferred embodiment of the invention has been shown and described, it will be apparent to those skilled in the art that changes and modifications can be made without departing from the principles and spirit of the invention, the scope of which is defined in the appended claims. Accordingly, the foregoing embodiments is to be considered illustrative rather than restrictive of the invention, and those modifications which come within the meaning and range of equivalency of the claims are to be included therein.

The invention claimed is:

1. A method for continuously monitoring the onset of water vapor saturation in a flowing gas stream, comprising:
   providing a continuously flowing stream of gas, flowing through a given area;
   adiabatically expanding the continuously flowing stream of gas, after it flows through the given area, to provide a fixed predetermined drop in the temperature thereof; and
   optically sensing condensate cloud formation in the flowing stream of gas, downstream of the given area.

2. A method as recited in claim 2 wherein the temperature drop is from two to five degrees centigrade.

3. A method as recited in claim 2 wherein the step of optically sensing condensate cloud formation comprises the steps of directing a beam of light into the continuously flowing gas stream and detecting light scattered from condensate droplets forming the cloud.

4. A saturation hygrometer for continuously monitoring the onset of water vapor saturation in a continuously flowing gas stream, comprising:
   temperature reducing means, having a reduced cross-sectional area, through which the continuous gas stream flows;
   the temperature reducing means providing a fixed, predetermined drop in the temperature of the continuously flowing gas stream;
   means directing a beam of light into the continuously flowing gas stream; and
   photosensitive means for detecting light scattered by condensate droplets formed in the continuously flowing gas stream, downstream of the area.

5. A saturation hygrometer as recited in claim 4, wherein the temperature reducing means comprises means for adiabatically expanding the continuously flowing gas stream.

6. A saturation hygrometer as recited in claim 4, wherein the temperature reducing means comprises a venturi duct section for adiabatically expanding the continuously flowing gas stream.

7. A saturation hygrometer as recited in claim 6 wherein the means directing a beam of light into the continuously flowing gas stream comprises means directing the beam of light diagonally across the venturi duct section.

8. A saturation hygrometer as recited in claim 6 wherein the means for directing a beam of light into the continuously flowing gas stream comprises a lamp mounted externally of the venturi duct section and a first fiber optics element extending through the wall of the venturi duct section, one end of the fiber optics element being aligned with the lamp outside the section and the other end of the fiber optics element being contiguous with the inner wall of the section.

9. A saturation hygrometer as recited in claim 8 wherein the other end of the fiber optics element forms a smooth continuation of the inner wall of the venturi duct section.

10. A saturation hygrometer as recited in claim 8 wherein the photosensitive means comprises a first photocell aligned with the beam and a second photocell out-of-alignment with the beam, the photocells being connected in a bridge circuit, and the hygrometer further comprising indicator means coupled to the bridge circuit.

11. A saturation hygrometer as recited in claim 10 wherein the bridge circuit is adjusted for fail-safe operation, whereby failure of the lamp will cause an indication by the indicator.

12. A saturation hygrometer as recited in claim 10 wherein the photocells are mounted externally of the venturi duct section, a second fiber optics element extends through the wall of the venturi duct section in alignment with the first fiber optics element and the first photocell, a third fiber optics element extends through the wall of the venturi duct section in alignment with the second photocell and out-of-alignment with the first fiber optics element, the third fiber optics element being directed toward a region of the venturi duct section in which condensate droplets will form when the continuously flowing gas stream becomes saturated.

13. A saturation hygrometer as recited in claim 12 wherein the inner ends of the second and the third fiber optics elements form smooth continuations of the inner walls surface of the venturi duct section.

14. A saturation hygrometer as recited in claim 4 wherein the photosensitive means comprises a pair of photocells connected in a bridge circuit, one photocell being aligned with the light beam and the second photocell being out-of-alignment with the beam and being directed toward a region in the continuously flowing gas stream within which condensation droplets will form when the gas becomes saturated.

15. A saturation hygrometer as recited in claim 4 further comprising means to introduce condensation nuclei into the continuously flowing gas stream to promote the formation of condensate droplets thereon.

References Cited

UNITED STATES PATENTS

| 2,654,242 | 10/1953 | Fallgatter et al. |
| 2,684,008 | 7/1954 | Vonnegut. |
| 3,358,148 | 12/1967 | Conklin et al. _____ 356—104 |

OTHER REFERENCES

"An Outline of Atomic Physics," Blackwood et al., Willy & Sons, 1955; pp. 292–296.

RONALD L. WIBERT, Primary Examiner

C. CLARK, Assistant Examiner

U.S. Cl. X.R.

73—17